No. 12,574. REISSUED DEC. 11, 1906.

D. INCHES & E. J. HOSKER.

STOP COCK HANDLE.

APPLICATION FILED MAR. 9, 1906.

WITNESSES

J. S. Custer

J. B. MacDonald

INVENTORS

David Inches

Edward J. Hosker by E. A. Wright

Att'y.

UNITED STATES PATENT OFFICE.

DAVID INCHES, OF NORTH BEND, AND EDWARD JAMES HOSKER, OF KAMLOOPS, BRITISH COLUMBIA, CANADA, ASSIGNORS TO THE WESTINGHOUSE AIR BRAKE COMPANY, OF PITTSBURG, PENNSYLVANIA, A CORPORATION OF PENNSYLVANIA.

STOP-COCK HANDLE.

No. 12,574. Specification of Reissued Letters Patent. Reissued Dec. 11, 1906.

Original No. 803,168, dated October 31, 1905. Application for reissue filed March 9, 1906. Serial No. 305,185.

*To all whom it may concern:*

Be it known that we, DAVID INCHES, residing at North Bend, and EDWARD JAMES HOSKER, residing at Kamloops, in the Province of British Columbia, Canada, citizens of the Dominion of Canada, have invented new and useful Improvements in Stop-Cock Handles, of which the following is a specification.

Our invention relates to an improved lock handle for stop cocks or valves, which, although particularly designed for application to the angle-cock of the Westinghouse air-brake train-pipe, is equally applicable to any stop cock or valve where it is desired to preclude the possibility of the handle being inadvertently turned.

Railway accidents have frequently happened, owing to the communication through the train-pipe being closed by the accidental moving of the stop-cock handle, and the handle, which is the subject of this application, is intended to avoid such mishap by providing a detent or lock, which will retain the handle in the open position unless it is deliberately intended to move it to shut the cock.

The principal object of this invention is to provide a stop-cock handle device of this character which may be applied to the standard angle-cock of the Westinghouse air-brake system without further change than the substitution of this handle for the existing one, and our effort has been to avoid all possible complication and provide a positive check against accidental movement of the handle in as simple and direct a manner as possible.

With this and other objects in view our invention comprises a member adapted to be secured to the stem or key-square of the plug cock or valve and an element pivoted or otherwise movably mounted on said member and having means adapted in one position of the valve to engage one of the stops or other part fixed on the cock-casing, and thereby prevent accidental movement of the cock.

The construction and application of one form of our improved handle device to a stop-cock is fully set forth in the following specification, reference being made to the drawings which accompany it, in which—

Figure 1:
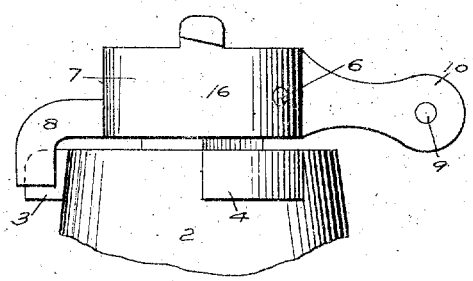
Figure 2:
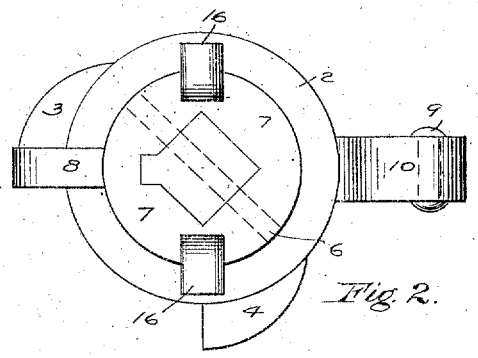
Figure 3:
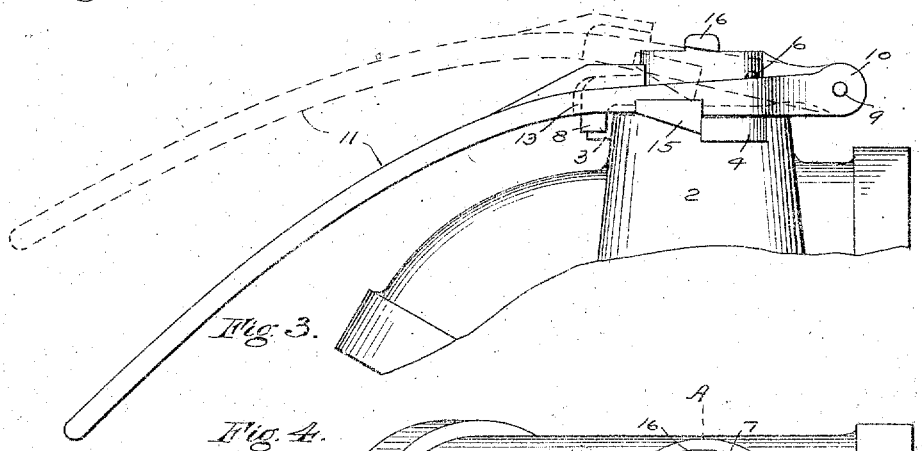
Figure 4:
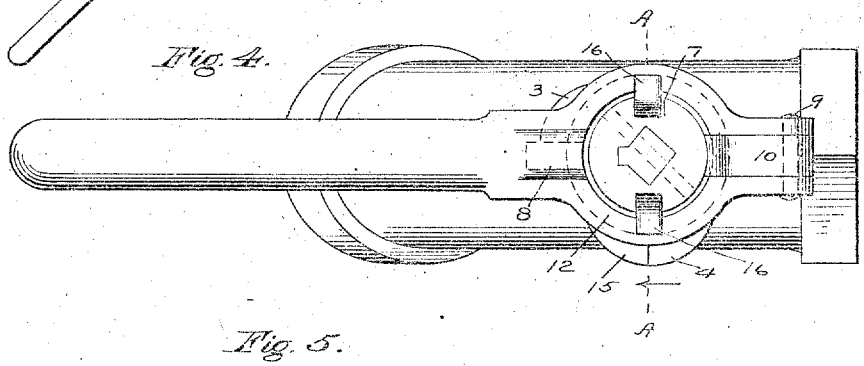

Figure 1 shows in elevation the portion which is secured to the key-square of the cock-plug; Fig. 2, a plan of the same; Fig. 3, an elevation of the handle complete; Fig. 4, a plan of the same, and Fig. 5 a cross-section on the line A A in Fig. 4.

In the drawings the upper part of the body of a stop-cock is represented by 2, the stops at present provided to limit the rotation of the plug in the cock being represented by 3 and 4, 3 being the stop in the open position, and 4 that limiting the movement beyond the shut position. Fitting the valve-stem or key-square of the plug-cock and secured thereto by a pin 6 in the usual manner is a member 7, having an outwardly and downwardly projecting finger or detent 8, designed to engage the limit-stops 3 and 4 of the stop-cock in the same manner as does the stop-pin of the existing handle. Backwardly projecting from this member 7 at the side opposite to the detent 8 is a portion 10, to which is pivotally connected by a pin 9 the fork end of a handle member 11, the fork being shaped, as at 12, to pass round and conform to the cylindrical portion of the member 7 and provided with a recess 13, which recess merely enables the lever to lie over and rest on the detent member 8 when the handle is in the locked position, but is not material to the operation of the handle.

Figure 5:
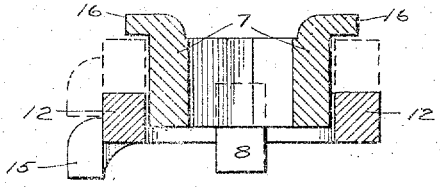

Downwardly projecting from the outer side of 12 adjacent to the stop 4 of the cock-body is a lug or detent 15, which when the handle is in the open position with its detent 8 against the stop 3 of the body will engage the stop 4 and prevent any movement of the handle to close the stop-cock; but when the handle is lifted up, as shown in dot-and-dash lines in Figs. 3 and 5, against the lugs 16, outwardly projecting from the upper side of 7, this detent 15 will be clear of the stop 4, and the handle may be moved to turn the plug of the cock to close the opening through it until the detent 8 of the member 7 engages the stop 4.

The operation of the device hardly requires further explanation. When the stop-cock is open, with the detent 8 against the stop 3, the handle will by its own weight drop to its lower position, in which position the detent 15 is in engagement with the stop 4 and will prevent any movement of the handle to close the stop-cock; but if the handle 11 be lifted against the lugs 16 the detent 15 will be clear of the stop 4 and the handle may be turned until the detent 8 engages that stop.

The back portion of the detent 15 is beveled away to enable the handle to be lowered over the back of the stop 4, and so that it will not interfere with the movement of the handle to open the cock.

It will be noticed that according to the preferred construction shown in the drawings the device comprises the addition to a plug-secured portion having a detent to limit its movement between stops on the body of the cock, of a pivotally-mounted handle member having a detent which will engage the "shut" stop when the stop of the plug-secured portion is against the "open" stop, whereby rotation of the plug is prevented until such engagement is released. It will be obvious, however, that the locking means or detent may, if desired, be arranged to engage with any other fixed portion of the cock-casing. The feature of our device relating to the pivoted handle member is particularly adapted to be applied in connection with train-pipe angle-cocks, on which it is necessary to use the long bent handle conforming to the bend in the train-pipe. In order to operate the angle-cock, the brakeman merely grasps the handle in the usual way and raising the same slightly at the same time turns the cock to the desired position. Then as the handle drops by gravity the detent engages the limit-stop and locks the cock against accidental movement.

No change is required in the design or construction of the stop-cock body. The present handle merely requires to be removed and the lock-handle, which is the subject of this application, supplied in its place and secured in the same manner as the original handle with a pin 9.

Although the device illustrated has been designed for application to a plug stop-cock, wherein a quarter-turn of the handle is required to effect the opening or closing, it is obvious that with slight modification the same device is equally applicable to a stop-valve of any kind in which the limiting-stops may be farther apart.

Having now particularly described our invention and the manner of its application, we hereby declare that what we claim as new, and desire to be protected in by Letters Patent, is—

1. In a device of the class described, the combination with a stop-cock, a valve having a pair of stops on its body, a cock-plug or valve-stem having a bracket member, said cock-plug or valve-stem having a finger for engaging one of the stops on the valve-body, and a handle including a bifurcated end hingedly secured to said bracket portion of the cock-plug or valve-stem and having a portion for surrounding said stem, said handle also having a lug for engaging the other stop on the valve-body, substantially as shown and described.

2. In a device of the class described, the combination with a stop-cock having stops to limit the movement of the handle at the open and closed positions of the plug, said stop-cock including a plug having a bracket member and having a detent for engaging said limiting-stops on the body of the cock, a handle member pivotally secured at one end to said bracket portion of the plug and having a detent for engaging the limiting-stop at the "shut" position and prevent movement toward it when the detent in the bracket member is against the stop of the "open" position but which may be relieved of such engagement by raising the handle on its pivot, substantially as shown and described.

3. In an apparatus of the class described, the combination with a stop-cock having stops to limit the movement of the handle, a member secured to the plug of the cock having a detent to engage such limiting-stops on the cock-body and on the opposite side a portion extended backward, a handle member pivotally secured to the backwardly-extended portion of the member secured to the plug and shaped to pass round that member, such handle member having a detent on one side that will when the detent of the member secured to the plug is against one stop on the cock-body engage the other stop and prevent rotation of the plug, but which may be lifted clear of the stop by the upward movement of the handle member and a lug to limit the upward movement of the handle beyond what is required to effect such clearance.

4. In a device of the class described, the combination with a stop-cock having stops 3 and 4 to limit the movement of the handle, a member 7 secured to the plug, such portion having a detent 8 and a pivot-support 10, a handle 11 divided as at 12 to pass round the member 7 and be pivotally connected to 10 and having a recess 13 to rest over the detent 8 and a detent 15 that will engage one stop of the cock-body when the detent 8 is in engagement with the other and lugs 16 to limit the upward movement of the handle.

5. A stop-cock device comprising a plug cock or valve, a valve-body having stops to limit the movement of the cock, a detachable member secured to the cock-key and provided with a pivoted handle having means adapted in one position of the cock to engage a stop fixed to the valve-body and lock the cock against accidental movement.

6. A stop-cock device comprising a plug cock or valve, a valve-body having stops to limit the movement of the cock, a detachable bracket member secured to the cock-key, and a vertically-movable handle pivoted to said bracket member and having a projection adapted in one position of the cock to engage a stop fixed to the valve-body and lock the cock against accidental movement.

7. A stop-cock device comprising a plug cock or valve, a valve-body having stops to limit the movement of the cock, and a vertically-movable handle pivotally secured to the cock-key and having a projection or detent for engaging one of the limit-stops on the casing and preventing accidental movement of the cock.

8. A locking-handle for stop-cocks comprising a bracket member adapted to be rigidly secured to the stem or key of the cock, and a handle pivoted on said bracket and having means for engaging a fixed part of the valve-body in one position of the cock to lock the same against accidental movement.

9. A stop-cock device comprising a plug-cock, a valve-body having stops to limit the movement of the cock at its open and closed positions, a bracket member secured to the cock-key, and a handle member provided with a bifurcated end pivoted to and surrounding the bracket-piece, said handle member having means for engaging a fixed stop on the casing for preventing accidental movement of the cock.

In testimony whereof we have hereunto set our hands.

DAVID INCHES.
EDWARD JAMES HOSKER.

Witnesses as to D. Inches:
N. C. SAWERS,
HENRY NYE.

Witnesses as to E. J. Hosker:
HENRY L. MORLEY,
SIDNEY C. BURTON.